United States Patent
Stanforth (10) Patent No.: US 9,386,459 B2
(45) Date of Patent: Jul. 5, 2016

(54) SPECTRUM ALLOCATION SYSTEM AND METHOD

(75) Inventor: Peter Stanforth, Winter Springs, FL (US)

(73) Assignee: SPECTRUM BRIDGE, INC., Lake Mary, FL (US)

( * ) Notice: Subject to any disclaimer, the term of this patent is extended or adjusted under 35 U.S.C. 154(b) by 827 days.

(21) Appl. No.: 13/595,666

(22) Filed: Aug. 27, 2012

(65) Prior Publication Data

US 2012/0322487 A1   Dec. 20, 2012

Related U.S. Application Data

(62) Division of application No. 12/702,621, filed on Feb. 9, 2010, now Pat. No. 8,279,823.

(51) Int. Cl.
| | |
|---|---|
| H04W 4/00 | (2009.01) |
| H04W 72/04 | (2009.01) |
| H04W 16/14 | (2009.01) |
| H04W 24/02 | (2009.01) |
| H04W 72/08 | (2009.01) |

(52) U.S. Cl.
CPC ............. *H04W 16/14* (2013.01); *H04W 24/02* (2013.01); *H04W 72/085* (2013.01)

(58) Field of Classification Search
None
See application file for complete search history.

(56) References Cited

U.S. PATENT DOCUMENTS

| | | | |
|---|---|---|---|
| 5,608,727 A | 3/1997 | Perreault et al. | |
| 5,729,531 A | 3/1998 | Raith et al. | |
| 7,349,880 B1 | 3/2008 | Kitao | |
| 7,460,837 B2 | 12/2008 | Diener | |
| 2001/0033610 A1 | 10/2001 | Chastain | |
| 2003/0032399 A1 | 2/2003 | Slupe | |
| 2004/0087310 A1 | 5/2004 | Williamson et al. | |
| 2006/0083205 A1 | 4/2006 | Buddhikot et al. | |
| 2006/0143111 A1 | 6/2006 | Mylet | |
| 2006/0160551 A1 | 7/2006 | Matoba et al. | |
| 2006/0218392 A1 | 9/2006 | Johnston | |
| 2006/0262768 A1 | 11/2006 | Putzolu | |
| 2006/0281468 A1* | 12/2006 | Gillin et al. ................... | 455/454 |
| 2007/0026868 A1 | 2/2007 | Kwon et al. | |
| 2007/0106596 A1 | 5/2007 | Bayyapu et al. | |

(Continued)

FOREIGN PATENT DOCUMENTS

| | | |
|---|---|---|
| EP | 1 641 296 | 3/2006 |
| JP | 2006-094001 | 4/2006 |

(Continued)

OTHER PUBLICATIONS

Ishizu Kentaro et al., "Prototype of Heterogeneous Type Cognitive Radio System", IEICE SR, Jul. 22, 2009.

(Continued)

*Primary Examiner* — Chi H Pham
*Assistant Examiner* — Soon-Dong D Hyun
(74) *Attorney, Agent, or Firm* — Tucker Ellis LLP (57) ABSTRACT

Spectrum asset class determination is dynamically assessed so that a radio device may use a more preferred one of licensed spectrum or unlicensed spectrum for the specific wireless communications application of the radio device. Licensed spectrum, in addition to unlicensed spectrum, may be made available to preferred radio devices by validating that the radio system has an equipment ID and a secondary ID that authorizes the use of the licensed spectrum by the radio system.

20 Claims, 4 Drawing Sheets

(56) References Cited

U.S. PATENT DOCUMENTS

| | | |
|---|---|---|
| 2007/0274404 A1 | 11/2007 | Papandriopoulos et al. |
| 2007/0293271 A1 | 12/2007 | Streeter |
| 2008/0052387 A1 | 2/2008 | Heinz et al. |
| 2008/0107095 A1 | 5/2008 | Black et al. |
| 2008/0108365 A1* | 5/2008 | Buddhikot ............ H04W 16/10 455/452.1 |
| 2008/0151743 A1 | 6/2008 | Tong et al. |
| 2008/0183634 A1 | 7/2008 | Sadler |
| 2008/0186882 A1 | 8/2008 | Scherzer et al. |
| 2008/0221951 A1 | 9/2008 | Stanforth et al. |
| 2008/0222019 A1 | 9/2008 | Stanforth et al. |
| 2008/0222021 A1 | 9/2008 | Stanforth et al. |
| 2008/0268892 A1 | 10/2008 | Hamdi et al. |
| 2009/0046625 A1 | 2/2009 | Diener et al. |
| 2009/0047920 A1 | 2/2009 | Livsics et al. |
| 2009/0116430 A1 | 5/2009 | Bonta et al. |
| 2009/0191889 A1* | 7/2009 | Abedi ................... H04W 16/06 455/452.1 |
| 2009/0197627 A1 | 8/2009 | Kuffner et al. |
| 2009/0323776 A1 | 12/2009 | Greenwood et al. |
| 2010/0137014 A1 | 6/2010 | Rao et al. |
| 2010/0195580 A1 | 8/2010 | Samarasooriya et al. |
| 2010/0216478 A1* | 8/2010 | Buddhikot ............ H04W 16/14 455/450 |
| 2011/0158147 A1* | 6/2011 | Li et al. ........................ 370/312 |
| 2011/0164186 A1 | 7/2011 | Sadek et al. |
| 2011/0164580 A1* | 7/2011 | Keon ........................... 370/329 |
| 2011/0211475 A1 | 9/2011 | Murakami et al. |
| 2011/0265133 A1 | 10/2011 | Kure |
| 2011/0282915 A1* | 11/2011 | Steer et al. .................... 707/802 |
| 2012/0170534 A1* | 7/2012 | Kim et al. .................... 370/329 |

FOREIGN PATENT DOCUMENTS

| | | |
|---|---|---|
| JP | 2007053546 | 3/2007 |
| JP | 2009-194898 | 8/2009 |
| JP | 2009206934 | 9/2009 |

OTHER PUBLICATIONS

Kwerel, Evan et al., "A Proposal for a Rapid Transition to Market Allocation of Spectrum", Federal Communications Commission, 2002, OPP Working Paper No. 38, pp. 1-50.

By the Commission, "Second Report and Order, Order on Reconsideration, and Second Further Notice of Proposed Rulemaking", Federal Communications Commission, 2004, FCC 04-167, pp. 1-180.

McKnight, Lee et al., "Best Effort versus Spectrum Markets: Wideband and Wi-Fi versus 3G MVNOs?", pp. 1-18, presented at the 29th annual TPRC, Oct. 27-29, 2001.

Prabhu, Krish et al., "Time for Action" Genuine Ideas, 2002, [retrieved online Feb. 1, 2008], <http://www.genuineideas.com/ArticlesIndex/TimeForAction.htm>.

FCC 08-260, Second Report and Order and Memorandum Opinion and Order, Adopted Nov. 4, 2008 and Released Nov. 14, 2008.

"Digital Dividend: Cognitive Access, Consultation on License-Exempting Cognitive Devices using Interleaved Spectrum", Ofcom, Publication Date: Feb. 16, 2009.

U.S. Spectrum Management Policy: Agenda for the Future, 1991.

Radio Spectrum Management, Module 5 of ICT Regulation Toolkit, ITU, 2007.

47 C.F.R. 15.713, Feb. 27, 2009, as amended Dec. 6, 2010.

Jones, Steven K. et al., "Initial Evaluation of the Performance of Prototype TV-Band White Space Devices", (2007), OET Report, FCC/OET 07-TR-1006.

\* cited by examiner

SPECTRUM ALLOCATION SYSTEM AND METHOD

RELATED APPLICATION DATA

This application is a divisional application of U.S. patent application Ser. No. 12/702,621 filed Feb. 9, 2010, the disclosure of which is incorporated herein by reference in its entirety.

TECHNICAL FIELD OF THE INVENTION

The technology of the present disclosure relates generally to wireless communications infrastructure and, more particularly, to a system and method for spectrum allocation for the support wireless communications, including the real time management of alternate spectrum asset classes.

BACKGROUND

Wireless networks and systems are becoming increasingly popular. But wireless communications are constrained due to a lack of available, interference free spectrum that may be used for reliable communications within a geographic area.

To enhance the availability and reliability of interference free spectrum, procedures that are governed by regulatory agencies (e.g., the Federal Communications Commission (FCC) in the United States) have been developed for allocating and governing spectrum use. In the U.S., for example, there are two general classes of spectrum, including licensed spectrum and unlicensed spectrum. With respect to the licensed spectrum, the FCC licenses spectrum in a primary spectrum market to Commission licensees. A secondary market exists for the Commission licensees to sublease spectrum for use by other parties. With some narrow exceptions (e.g., government priority rights), licensed spectrum is exclusively reserved for the corresponding Commission licensee and any subleasee(s).

Unlicensed spectrum may be used by used without a license and by virtually any party, but regulations on the spectrum may be imposed. Exemplary unlicensed spectrum includes industrial, scientific and medical (ISM) bands and information infrastructure (UNII) bands. These bands are open to all users provided the users comply with certain regulations. In the U.S., these regulations are known as FCC Part 15. Traditionally, these bands have been used for microwave ovens, cordless phones, low powered wireless remote controls, and similar devices. Recently, with the advent of IEEE 802.11 (commonly known as WiFi), these bands have become very popular for computer communications and mobile data communications activities, as well as for point-to-point and point-to-multipoint applications. As the number of installations and users of these applications has increased the unlicensed ISM and UNII spectrum bands have become very crowded.

Other unlicensed spectrum includes spectrum that has been freed by the conversion of analog television (TV) broadcasts to digital TV broadcasts. This conversion has freed spectrum channels for use by unlicensed radio systems to offer various services, such as mobile communications and Internet access. The available spectrum is commonly referred to as TV White Spaces, which are made up of the guard bands and unused TV channels between channel 2 and channel 51 (corresponding to 54 MHz to 698 MHz). To avoid interference with digital TV broadcasts and other incumbent systems, such as wireless microphone systems, radios that use the TV White Spaces are required to register and receive a channel map of available channels that may be used for the communications activity of the radio system. Current regulations require these radio systems to register every twenty-four hours. Also, for mobile radios, if the radio moves into a new location, a new registration is required. Other regulations on the radios are present, such as transmitted power limits for different types of radios. Additional information regarding the regulation of TV White Spaces may be found in FCC 08-260, Second Report and Order and Memorandum Opinion and Order, Adopted Nov. 4, 2008 and Released Nov. 14, 2008, the entirety of which is incorporated herein by reference. Similar proposals have been made in places other than the United States. For example, Ofcom in the United Kingdom has described access to certain spectrum by cognitive radios in "Digital Dividend: Cognitive—Access Consultation on License-Exempting Cognitive Devices Using Interleaved Spectrum," published Feb. 16, 2009.

SUMMARY

Spectrum asset class determination is dynamically assessed so that a radio device may use a more preferred one of licensed spectrum or unlicensed spectrum for the specific wireless communications application of the radio device. Licensed spectrum, in addition to unlicensed spectrum, may be made available to preferred radio devices by validating that the radio system has an equipment ID and a secondary ID that authorizes the use of the licensed spectrum by the radio system.

According to one aspect of the disclosure, a method of supporting a wireless communications application of a radio system includes establishing spectrum class determination criteria for the wireless communication application, each determination criterion biased toward one of licensed spectrum or unlicensed spectrum; and determining to use licensed spectrum or unlicensed spectrum for the wireless communications application by collectively evaluating the determination criteria.

According to another aspect of the disclosure, a method of supporting a wireless communications application of a radio system includes establishing spectrum class determination criteria for the wireless communication application, presenting the spectrum class determination criteria to a user entity for evaluation; and determining to use licensed spectrum or unlicensed spectrum for the wireless communications application from user input that is received in response to the presenting.

According to another aspect of the disclosure, a spectrum class determination device for supporting a wireless communications application of a radio system includes a processor configured to establish spectrum class determination criteria for the wireless communication application, each determination criterion biased toward one of licensed spectrum or unlicensed spectrum, and determine whether to use licensed spectrum or unlicensed spectrum for the wireless communications application by collective evaluation of the determination criteria.

According to yet another aspect of the disclosure, a method of availing spectrum to a radio system for conducting wireless communications, the radio system having an equipment ID and a secondary ID, includes receiving a channel map request, the equipment ID and the secondary ID from the radio system; and constructing a channel map containing available unlicensed channels and at least one licensed channel that the radio system, as identified by the equipment ID and the secondary ID, has an authorization to use.

According to still another aspect of the disclosure, a spectrum management system that avails spectrum to a radio system for conducting wireless communications, the radio system having an equipment ID and a secondary ID, includes a network interface over which a channel map request, the equipment ID and the secondary ID is received from the radio system; and a processor configured to construct a channel map containing available unlicensed channels and at least one licensed channel that the radio system, as identified by the equipment ID and the secondary ID, has an authorization to use.

According to another aspect of the disclosure, a TV White Spaces band radio (TVBD) includes a transceiver for carrying out wireless data communications; a memory that stores an equipment ID and a secondary ID, the equipment ID and the secondary ID indicative to a spectrum management system that the TVBD is authorized to use predetermined licensed spectrum; and a controller configured to register for a channel map with the spectrum management system by transmitting a channel map request, the equipment ID and the secondary ID.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Embodiments will now be described with reference to the drawings, wherein like reference numerals are used to refer to like elements throughout. It will be understood that the figures are not necessarily to scale.

A. Overview

A(1). Parties

Various entities that may have a relationship to electromagnetic spectrum for use in wireless communications are described in this document. One entity is a government or regulatory agency. In the United States, the governmental agency may be the FCC. The governmental agency controls the rules and/or regulations for how wireless spectrum may be used. Exemplary rules governing certain spectrum are described in the above-mentioned FCC 08-260. Another exemplary agency is Ofcom in the United Kingdom.

In some situations, there may be a spectrum holder. A spectrum holder is any entity having the authority to release spectrum use to another entity by granting the other entity access to the spectrum. The granting of access may be a temporary permission to use spectrum that is associated with the holder. Therefore, the access grant need not be a lease or a sub-lease, as defined by the FCC. The holder may be, but is not limited to, a government or regulatory agency (e.g., in the United States, the FCC), a Commission licensee (e.g., in the United States, an entity that has licensed spectrum from the FCC in the primary spectrum market), or a secondary market licensee.

Another party may be a spectrum user, or simply a user. A user is any entity or wireless communications system that has a need for spectrum in order to carry out wireless communications, such as for offering wireless communications services to others or Internet access to mobile client devices. With the transition of analog TV broadcasts to digital TV broadcasts, user radios may seek registration in accordance with FCC 08-260 to gain access to TV White Spaces. These radios are referred to TV White Spaces band radios (TVBDs). Therefore, one exemplary user may be a TVBD. Other users may be radio systems that request spectrum allocation from a spectrum management system or other source.

Another party may be a radio equipment manufacturer. Radio equipment manufacturers may be responsible for associating an equipment identifier (ID) with each radio that is made by the manufacturer.

Still another party may be an entity or system that manages registration of the various users and/or allocates spectrum to various radio systems. Allocation of spectrum may include providing a channel map of available unlicensed bands (e.g., TV white space bands) and/or providing access to licensed spectrum. This party may carry out such management using a central registration system as described in greater detail below.

A(2). Wireless Communications Context

Aspects of the disclosed systems and methods are independent of the type or types of radio devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to fixed location and/or mobile radio devices. The methods and systems may be applied to licensed and/or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable environment.

In the case of managing spectrum related to TV White Spaces, radio systems with priority to the spectrum, including incumbent radio systems, have spectrum use rights that are superior to secondary spectrum users, such as TVBDs. The secondary radio systems may use spectrum that is interleaved with spectrum used by priority (or primary) radio systems. A registration system to manage such spectrum use and allocation is described in U.S. patent application Ser. No. 12/423,094 filed Apr. 14, 2009, the disclosure of which is incorporated herein by reference in its entirety. A registration system of this nature may be combined with or coordinate its activity with the spectrum management systems that are described in greater detail below.

Although aspects of the disclosed systems and methods are described in the exemplary context of TV White Spaces, the disclosed concepts may be applied to other operational scenarios. One operational scenario includes a system in which requests or bids for spectrum are matched to available spectrum that is posted on a spectrum brokerage or exchange. A system that manages spectrum use and allocation in this operational context is described in U.S. patent Ser. No. 12/042,543 filed Mar. 5, 2008, the disclosure of which is incorporated herein by reference in its entirety. In this exemplary context, the user may be granted a spectrum certificate or other data object that specifies the spectrum that may be used by the user in terms of communications-related information, such as geography, frequency, spectral mask, time, and power limits.

B. Spectrum Class Determination

At certain times both licensed and unlicensed spectrum may be available for use by a radio system. This section of the disclosure describes systems and methods for determining whether the radio system should employ licensed spectrum or unlicensed spectrum. Unlicensed spectrum is generally a cheaper alternative since monetary payment for the spectrum may be avoided. But unlicensed spectrum may be used by other radio systems, which could lead to interference and quality of service (QOS) issues.

There are a number of incentives for maintaining a flexible approach to spectrum usage that includes using licensed spectrum, unlicensed spectrum, or both depending on various considerations as will be described. The disclosed approach to spectrum class determination is established with the premise that there is a desire by users to mitigate the inherent risks of relying on unlicensed spectrum. But it will be appreciated that tolerance to such risks may be a variable factor depending on the user's application and this variability may be considered as part of the determination.

In general, unlicensed spectrum is available to all users on a non discriminatory basis. But the availability of unlicensed spectrum and a low degree of interference from other users cannot be guaranteed for any individual user. Many applications, including "business critical" and "mission critical" applications, are intolerant to a lack of service or degraded service. For these applications, reliance on unlicensed spectrum may not be practical. But many entities having "critical" applications also may have some "non-critical" communications and/or communications that are "non-critical" as long as data transmission is delivered within a reasonable time period. The disclosed techniques manage a user's use of unlicensed and/or licensed spectrum for optimum wireless communications efficiency at a cost that may be lower than exclusively relying on licensed spectrum.

A wide variety of user applications may be served under an approach that assesses the usability of licensed and unlicensed spectrum in a cost effective manner. The alternative of purchasing enough spectrum to cover all the user's wireless spectrum needs could be orders of magnitude more expensive than purchasing access rights to a limited amount licensed spectrum for use with one or more specific applications.

An example of a "mission-critical" application may be a medical application, such as telemedicine where a medical professional (e.g., a doctor) provides medical services for a remotely located patient. Such an application may include the control of robotic surgical equipment. In an urban area, the use of unlicensed spectrum for such an application may not deliver desired minimum spectrum availability for the application. As a result, licensed spectrum would be preferred to unlicensed spectrum for this application. But in less densely populated areas, the availability of unlicensed spectrum may be abundant enough to support the application.

The disclosed approach similarly would permit a data service provider (e.g., a company such as Yahoo, Google, or Microsoft), to supply direct data connection to consumers as opposed to using a wired service (e.g., as offered by a cable company or a telephone company) or a wireless service (e.g., as offered by a mobile telephone service provider). In most areas, enough unlicensed spectrum may be available to support this application, but in a dense urban areas where unlicensed white space may be congested, the application may be augmented by leveraging licensed spectrum to improve QOS. A similar approach could be taken by a satellite television company to expand offered services to include voice and data services.

For the purpose of example, the following description will be made in the context of using TV White Spaces for unlicensed spectrum and low power television (LPTV) stations that are permitted to be used for data operations for licensed spectrum. It will be appreciated that other types of unlicensed and/or licensed spectrum may be considered when determining the spectrum class for a user application. A radio device of a user that is configured to operate in TV White Spaces (e.g., a TVBD) is capable of operating in any TV channel from channel 2 to 51 that is not occupied by a TV station in the location of the radio device. A TV White Spaces database may be used to track the channels that are available and are not available to TVBDs on a location by location basis. For example, if channel 14 has been licensed to a LPTV operator in the location of the TVBD, then channel 14 will not be available to the TVBD.

In this example, the operator of channel 14 may desire to make the spectrum available to users that are willing to pay for the use of the spectrum. The user may wish to know that the option to use licensed spectrum exists and, either manually or automatically, determine whether to pay for and use the licensed spectrum or to use the available unlicensed spectrum. The reasons that the user may desire to use the licensed spectrum (the LPTV channel in this example) include less interference and better QOS through controlled access, better coverage through the ability to use licensed power levels rather than unlicensed power levels, and the coverage provided by the license contour. These reasons may be weighed against the price of using the licensed spectrum.

If a user has plural wireless communication applications, each application may be analyzed separately to determine whether to use licensed or unlicensed spectrum for the application. Alternatively, all applications of the user may be analyzed collectively to make a determination on a user-wide basis. It is noted that the following examples reflect current FCC regulatory constraints on the use of TV White Spaces, but implementation of the disclosed techniques is not constrained these regulations and may be extended to spectrum other than TV White Spaces.

Figure 1:
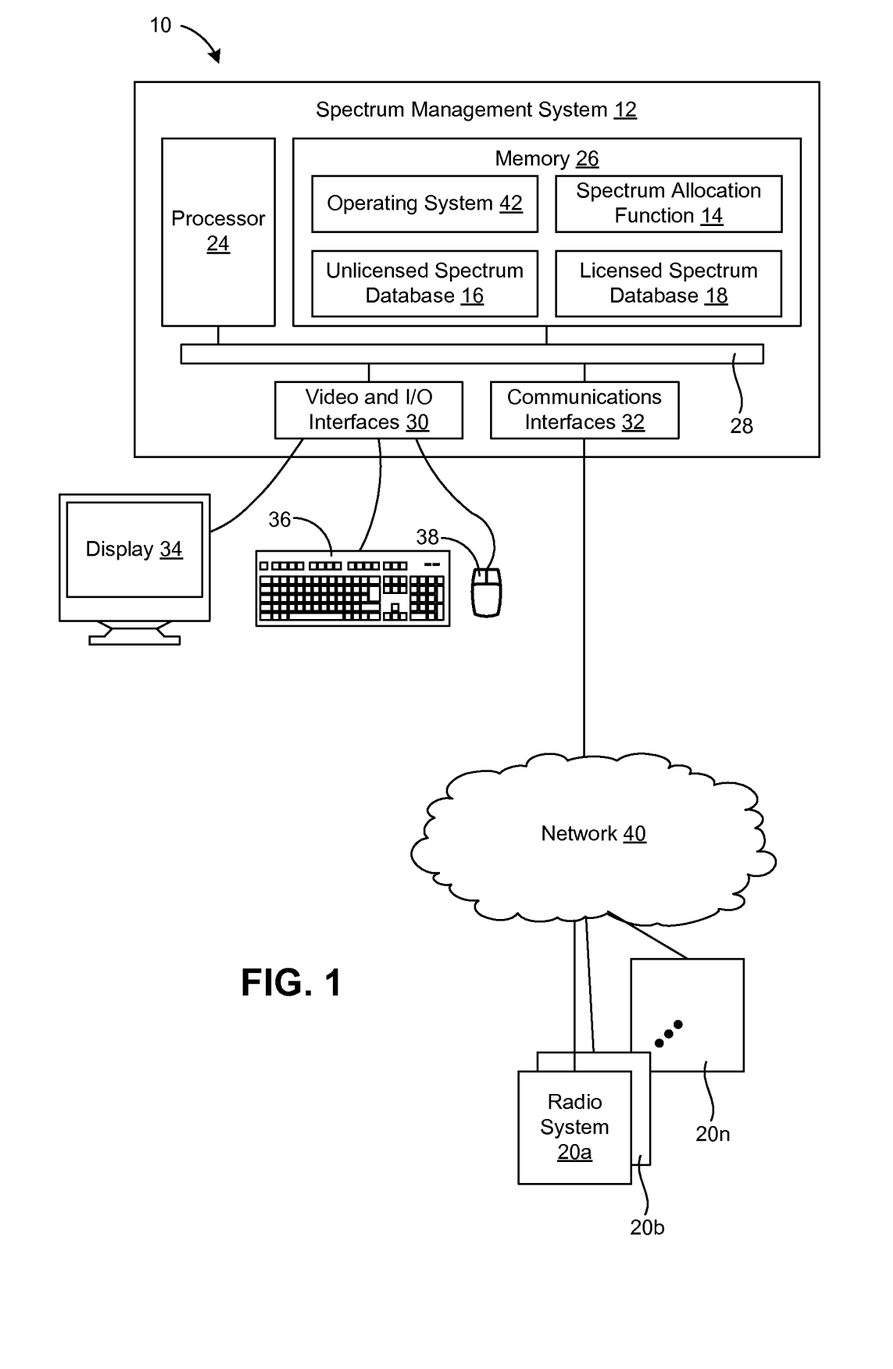
FIGS. 1-3 are schematic views of exemplary systems for managing spectrum allocation in which spectrum for a radio system may be obtained from alternate spectrum classes.
Figure 2:
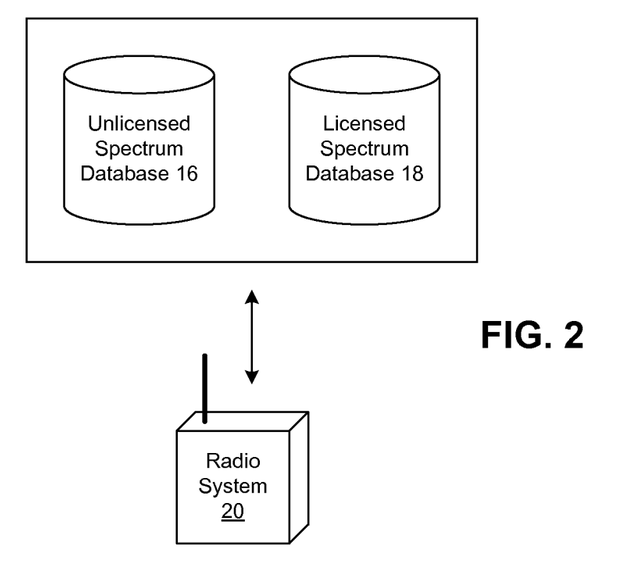
Figure 3:
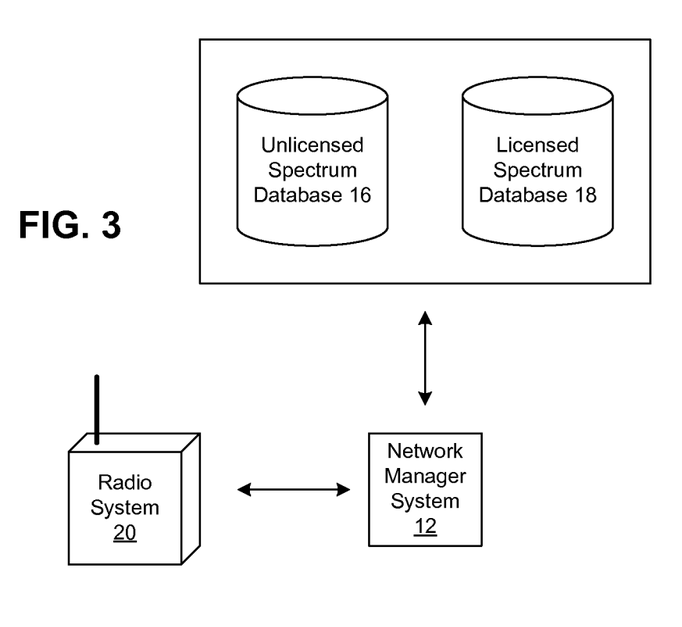

Referring now to FIGS. 1-3, illustrated are various exemplary embodiments of systems that determine whether to use unlicensed spectrum or licensed spectrum. In FIG. 1, illustrated is a schematic block diagram of a computer-based system 10 capable of executing computer applications (e.g., software programs). The system 10 may include a central spectrum management system 12 that is implemented using computer technology. The spectrum management system 12 may be configured to execute a spectrum allocation function 14, and to store an unlicensed spectrum database 16 that contains data regarding unlicensed spectrum availability and a licensed spectrum database 18 that contains data regarding licensed spectrum availability. The unlicensed and licensed spectrum availability information may be used by the spectrum allocation function 14. While shown in the embodiments of FIGS. 1-3 as separate databases, it will be appreciated that the unlicensed spectrum availability information and the licensed spectrum availability information may be stored in a common database.

In the illustrated embodiment, the spectrum allocation function 14, the unlicensed spectrum database 16 and the licensed spectrum database 18 are commonly hosted in the spectrum management system 12. In this embodiment, the spectrum management system 12 is tasked with making spectrum usage determinations for one or more radio systems 20 (labeled as radio systems 20a through 20n in FIG. 1). Each radio system 20 may be an individual radio device or a network of radio devices. Also, each radio system 20 may include at least one transceiver for engaging in wireless communications and a controller for managing radio system operation.

In other embodiments, the spectrum allocation function 14, the unlicensed spectrum database 16 and the licensed spectrum database 18 may be distributed. For instance, as illustrated in FIG. 2, the functions of the spectrum allocation function 14 may carried out by the radio system 20 that accesses a remotely hosted unlicensed spectrum database 16 and a remotely hosted licensed spectrum database 18. In this embodiment, the unlicensed spectrum database 16 and the licensed spectrum database 18 may be maintained by different hosts or by the same host.

FIG. 3 illustrates another example where a network manager system 22 carries out the functions of the spectrum allocation function 14 on behalf of the radio system 20. The network manager system 22 may access a remotely hosted unlicensed spectrum database 16 and a remotely hosted licensed spectrum database 18. In this embodiment, the unlicensed spectrum database 16 and the licensed spectrum database 18 may be maintained by different hosts or by the same host.

In the embodiments of FIGS. 2 and 3, the device that carries out the functions of the spectrum allocation function 14 may be implemented with appropriate computing technology to perform the various tasks of the spectrum allocation function 14. For the sake of brevity, only the system 12 will be described in detail, but it will be appreciated that the radio system 20, the network manager system 22, and any database 16 and/or 18 hosts may be configured in similar manners.

In one embodiment, the spectrum allocation function 14 is embodied as one or more computer programs (e.g., one or more software applications including compilations of executable code). The computer program(s) and/or databases 16 and 18 may be stored on a computer readable medium, such as a memory in the form of a magnetic, optical or electronic storage device (e.g., hard disk, optical disk, flash memory, etc.).

To execute the function 14, the system 12 may include one or more processors 24 used to execute instructions that carry out a specified logic routine(s). In addition, the system 12 may have a memory 26 for storing data, logic routine instructions, computer programs, files, operating system instructions, and the like. As illustrated, the function 14 and the databases 16 and 18 may be stored by the memory 26. The memory 26 may comprise several devices, including volatile and non-volatile memory components. Accordingly, the memory 26 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices. The processor 24 and the components of the memory 20 may be coupled using a local interface 28. The local interface 28 may be, for example, a data bus with accompanying control bus, a network, or other subsystem.

The system 12 may have various video and input/output (I/O) interfaces 30 as well as one or more communications interfaces 32. The interfaces 30 may be used to operatively couple the system 12 to various peripherals, such as a display 34, a keyboard 36, a mouse 38, other user input devices, a microphone (not shown), a camera (not shown), a scanner (not shown), a printer (not shown), a speaker (not shown) and so forth. The communications interface 32 may include for example, a modem and/or a network interface card. The communications interface 32 may enable the system 10 to send and receive data signals, voice signals, video signals, and the like to and from other computing devices via an external network 40 (e.g., the Internet, a wide area network (WAN), a local area network (LAN), direct data link, or similar systems). The interface between the system 12 and any operatively interfaced device or network may be wired or wireless.

The memory 26 may store an operating system 42 that is executed by the processor 24 to control the allocation and usage of resources in the system 12, as well as provide basic user interface features. Specifically, the operating system 42 controls the allocation and usage of the memory 26, the processing time of the processor 24 dedicated to various applications being executed by the processor 24, and the peripheral devices, as well as performing other functionality. In this manner, the operating system 42 serves as the foundation on which applications, such as the function 14, depend as is generally known by those with ordinary skill in the art. The operating system 42 also may control much of the user interface environment presented to a user, such as features of the overall graphical user interface (GUI) for the system 12.

In one embodiment, the system 12 may be configured as a server that executes the function 14 to host the below-described spectrum management functions. The spectrum management functions include providing spectrum use determinations to qualified users (e.g., as embodied as the radio system(s) 20) so that the users may make use of spectrum for wireless communications.

In the embodiment where the unlicensed spectrum is TV White Spaces, the unlicensed spectrum database 16 may be implemented using a white space database and registration system that is constructed in accordance with the above-mentioned FCC Report and Order and/or implemented in accordance with the above-mentioned U.S. patent application Ser. No. 12/423,094. The information included in this database may describe the location, contour, access or use rules (e.g., transmit power limits), and any other pertinent data related to the unlicensed spectrum. In one embodiment, data regarding the availability of the unlicensed spectrum may be obtained by polling the white space database and registration system for a TV White Spaces channel map.

The licensed spectrum database 18 may include information regarding licensed channels that have been made available by a holder of the spectrum to potential users. The information included in this database may be similar to the unlicensed spectrum database 16, and may describe the location, contour, and owner of the licensed channel. In addition, the database may include access or use rules that describe the type of users that are permitted to use the channel, the types of applications that are permitted over the channel, transmit power limits, and so forth. The database may also include price of use for the channel that the user will be required to pay to the holder if the licensed channel is employed. The price may be specified in any appropriate manner, such as a monetary amount per megahertz and/or a monetary amount per unit of time. In other embodiments, the user may subscribe to use licensed channels on a prearranged payment basis.

In one embodiment, the unlicensed spectrum database 16, the licensed spectrum database 18 and/or the radio system 20 may collect information on actual spectrum usage over various channels. Exemplary techniques for assess actual spectrum usage may include spectrum use sensing by the radio system 20, reports from other radio systems based on their spectrum usage and/or spectrum use sensing, spectrum sniffing by third party devices, historical usage of unlicensed spectrum for similar time periods, and so forth.

The spectrum class determination features of the spectrum allocation function 14 will now be described. The spectrum allocation function 14 may be implemented as a logical engine to decide between using licensed spectrum or unlicensed spectrum for at least one wireless communications application of the radio system 20. Determination criteria may specify a number of factors that are collectively evaluated so as to determine which spectrum class to employ. For instance, a 20 MHz wide unlicensed channel may be a worse choice than a 5 MHz licensed channel if the 20 MHz unlicensed channel is congested and the 5 MHz licensed channel is idle, even though the user may be required to pay for use rights to the licensed channel.

The determination criteria may be specified as a number of individual variables, each of which could impact the determination, singularly or collectively, by biasing the determination toward licensed spectrum or unlicensed spectrum. Depending on the circumstances, an individual determination criterion could be neutral so as not to bias the determination. An exemplary determination criterion variable is cost of available licensed spectrum. In one embodiment, the higher the cost of licensed spectrum, the more the cost variable may bias the determination toward using unlicensed spectrum.

Another exemplary determination criterion variable is bandwidth that is needed to support the intended application. In one embodiment, the bandwidth variable biases the determination toward the spectrum class that is capable of providing the most bandwidth at the time that spectrum is desired.

Another exemplary determination criterion variable is quality of service that is needed to support the intended application. In one embodiment, the QOS variable may be thought of as a proxy metric that reflects the importance or criticality of the application to the user: Alternatively, there may be a separate criticality determination criterion variable. As the needed QOS increases, the QOS variable may bias the determination toward using licensed spectrum that can deliver a corresponding degree of QOS since use access is controlled for licensed spectrum. An unlicensed spectrum congestion determination criterion variable may be used as a counter-weighting determination criterion variable to the QOS variable. The unlicensed spectrum congestion determination criterion variable may be determined from actual or predicted usage data relating the unlicensed spectrum. Therefore, if unlicensed spectrum usage is low, the QOS variable may be reduced or a QOS counter-weight variable may be introduce to bias the determination toward unlicensed spectrum.

Another exemplary determination criterion variable is the coverage, or range, that is needed to support the intended application. In embodiment, if wide-ranging coverage is desired, the coverage variable may bias the determination toward licensed spectrum since it is typical that the radio system may operate at higher power and incur less interference when operating using licensed spectrum. Higher power may improve the coverage and or range of the radio.

Another exemplary determination criterion variable is the time availability of spectrum. For instance, licensed spectrum may have been allocated to other users for a portion of the time during which the user may desire spectrum. Such a time constraint on the licensed spectrum may bias the determination toward use of unlicensed spectrum.

In one embodiment, each of the decision criteria variables may be specified as a numerical value, such as one to one hundred, where the lower the number, the more the variable biases the determination toward unlicensed spectrum. Once established, each of the determination criteria variables may be combined with the other determination criteria variables. For instance, a weighted sum or an unweighted sum of the variable values may be established. A combined total less than a predetermined threshold may indicate use of unlicensed spectrum (or vice versa). In one embodiment, if a single variable has a value above or below a predetermined threshold, the variable by itself may specify use of unlicensed spectrum or licensed spectrum. Other expert system evaluation techniques to collectively evaluate the decision criteria, regardless of the manner in which the decision criteria are expressed (e.g., cost in monetary units, bandwidth in megahertz, etc.), are possible.

In another embodiment, a user entity associated with the radio system 20 may be offered a choice as to whether to use licensed or unlicensed spectrum. In this embodiment, one or more decision criteria may be ascertained and presented to the user to guide the choice. For instance, the cost of licensed spectrum and/or a comparison of operational performance between licensed and unlicensed spectrum may be presented to the user for a specific wireless operation or connection session. As an example, if the user commenced a data download, a determination of how long the download may take using licensed spectrum and unlicensed spectrum may be made, as well as the cost of using licensed spectrum for the download operation. Then, the user may be asked which class of spectrum to use. In one approach, the user may not be asked to choose the spectrum class directly. Rather, a question may be posed in a form so that the user's answer guides the spectrum class determination. For instance, an exemplary question may be "downloading will take xxx minutes, would you like to pay $y to complete the download in x minutes." As will be appreciated, the longer download operation corresponds to the use of unlicensed spectrum and the shorter download operation corresponds to the use of licensed spectrum. Therefore, if the user's answer is in the negative, unlicensed spectrum may be used and if the user's answer is in the affirmative, licensed spectrum may be used.

After a determination to use licensed or unlicensed spectrum is made, the radio system 20 may request appropriate spectrum from the spectrum management system 12. If a determination to use unlicensed spectrum is made, the request may be in the form of a request for a TV White Spaces channel map, for example. In one embodiment, in response to a request for a channel map the spectrum management system 12 will generate a channel map that contains both licensed and unlicensed spectrum. The radio system 20 will then determine a channel to use based on the spectrum class determination. In another embodiment, if a determination to use licensed spectrum is made, the radio system 20 may seek licensed spectrum from an automated spectrum exchange or other spectrum allocation system.

C. Preferential Spectrum Allocation

This section of the disclosure describes systems and methods for availing spectrum to a radio system. In one embodiment, specially designated or reserved spectrum may be availed to a radio system so that the radio system may be treated in a preferred manner over other radio systems. The disclosed techniques may be applied to the allocation of licensed spectrum, unlicensed spectrum, or a mix of licensed and unlicensed spectrum. The disclosed techniques may build upon a white space database and registration system that is constructed in accordance with the above-mentioned FCC Report and Order and/or implemented in accordance with the above-mentioned U.S. patent application Ser. No. 12/423, 094.

Figure 4:
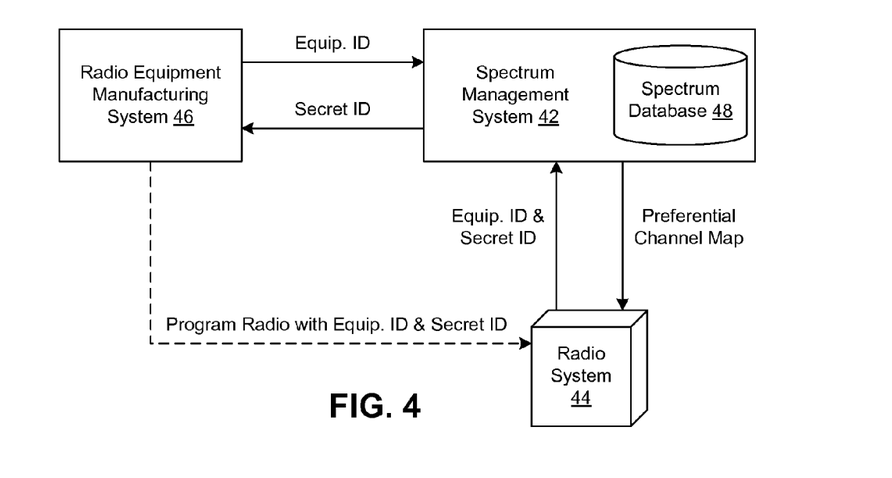
FIGS. 4-6 are schematic views of exemplary systems for managing spectrum allocation so as to provide a radio system with a preferential channel map.

With additional reference to FIG. 4, a spectrum management system 42 may be configured to supply channel maps or other data that avails spectrum access to one or more privileged radio systems 44. The spectrum management system 42 may be implemented with computing technology similar to that described with respect to the spectrum management system 12. Although not illustrated, communication between the radio system 44 and the spectrum management system 42 may be through a network (e.g., the network 40). In one embodiment, the spectrum management system 42 may include a white space registration system for registering TVBD or other types of radio systems and the white space registration system may include enhancements to support preferential spectrum allocation for one or more privileged radio systems 44.

In the exemplary embodiment that follows, a secret identifier (ID) is encoded into a radio. The secret ID may be considered one form of a secondary ID that distinguishes the radio, affiliated network, or a user entity of the radio or network as belonging to a privileged radio system class. Other secondary IDs may include, an equipment or personal identifier and/or a password that is part of, or subscribed to, a radio device, a network to which the radio is associated, or a user entity of a radio device.

The radio system 44 may be configured with an ability to securely identify itself to the spectrum management system 42. For example, during manufacture of the radio system 44, a radio manufacturing system 46 may program (e.g., encode) the radio system 44 with a unique equipment identifier (ID) and a secret ID. The equipment ID may be programmed in accordance with FCC or other regulator agency standards. The secret ID, in combination with the equipment ID, may be used by the radio system 44 to identify itself to the spectrum management system 42. In one embodiment, the manufacturing system 46 may obtain the secret ID from the management system 42 by supplying the equipment ID to the management system 42 prior to programming of the radio system 44. In response, the management system 42 may return a corresponding secret ID to the manufacturing system 46 for programming into the radio system 44.

The logical flow of programming the radio system 44 may proceed using the following steps, for example. The manufacturer system 46 may inform the management system 42 that a radio device forming part of the radio system 44 has been manufactured and may supply the equipment ID. The management system 42 may respond with the secret ID. The management system 42 may store the secret ID in association with the equipment ID for future recognition of the radio system 44. The management system 42 and the manufacturing system 46 may have a prearranged "shared secret" key or public/private key in order to maintain security and data integrity, and to minimize the risk of unauthorized acquisition of secret IDs. Then, the manufacturing system 46 may encode the equipment ID and the secret ID in the radio system 44.

In another embodiment, the secret ID is not encoded by the manufacturer system 46. Instead, the secret ID may be obtain by the user of the radio system 44 by enrolling in a preferential spectrum service, which may include the payment of a fee.

After having been purchased by a user and deployed, the radio system 44 may communicate with the management system 42 to obtain a channel map or other spectrum allocation from the management system 42. The communication may include, for example, a channel map request transmitted from the radio system 44 to the management system 42. The communication between radio system 44 and spectrum management system 42 may occur at power-up of the radio system 44 and/or at appropriate time intervals. The management system 42 may maintain a spectrum database 48 and/or access a spectrum database hosted by another system when determining spectrum allocation for the radio system 44. The management system 42 may validate the radio system 42 using the equipment ID and secret ID. In addition, the radio system 44 may validate that the radio system 44 has communicated with the appropriate management system 42 in the case where there are plural management systems 42 from which channel maps are accessible. In similar manner to the communications between the manufacturing system 46 and the management system 42, the radio system 44 and management system 42 may use prearranged communication protocols in order to maintain security and data integrity, and to minimize the risk of unauthorized acquisition of secret IDs.

Once the management system 42 validates the radio system 44, the management system may provide the radio system 44 with a channel map or a spectrum certificate that allows the radio system 44 to use specified spectrum. The channel map or other spectrum application will contain spectrum (e.g., available TV White Spaces) that is appropriate for the location of the radio system 44. In one embodiment, the channel map or certificate may enable the radio system 44 to use spectrum that other radio systems may not access (e.g., radio systems that do not have the secret ID will not have authorization to access some or all of the spectrum in the channel map provided to the radio system 44). For instance, the manufacturer or the user of the radio system 46 may pay a subscription fee or a per use fee to make spectrum exclusively available to the radio system 44, or make spectrum available to a limited number of radio systems in an overlapping geographic area.

In one embodiment, the channel map provided to the radio system 44 may include available unlicensed channels. These are the same channels that would be available to any radio system. In addition to the publically available channels, the channel map may include one or more additional channels that the radio system 44 may use, but other radio systems may not. These additional channels, which will be referred to as preferential channels, may be identified so that the radio system 44 may take advantage of the preferential channels. In some embodiments, it is possible that plural radio systems 44 may be provided with use rights in the preferential channels. In other embodiments, the management system 42 may construct channel maps to minimize interfering use of the preferential channels.

Figure 5:
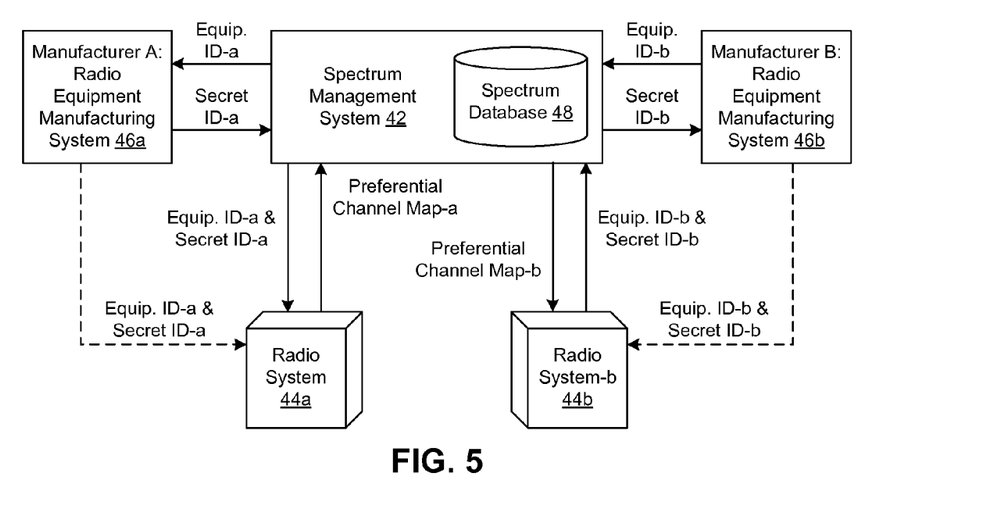

With additional reference to FIG. 5, the spectrum management system 42 is illustrated in an embodiment where there are plural preferred radio systems 44a, 44b that are manufactured by respective manufacturers 46a, 46b. The radio systems 44 will each have unique equipment IDs and unique secret IDs. The radio systems 44 may query the spectrum management system 42 for corresponding channel maps that contain preferential channels. The preferential channels may be the same for each of the radio systems 44a, 44b or may be different for each of the radio systems 44a, 44b. In one embodiment, the preferential channels for each radio system 44 have correspondence to the respective manufacturer of the radio system 44.

Figure 6:
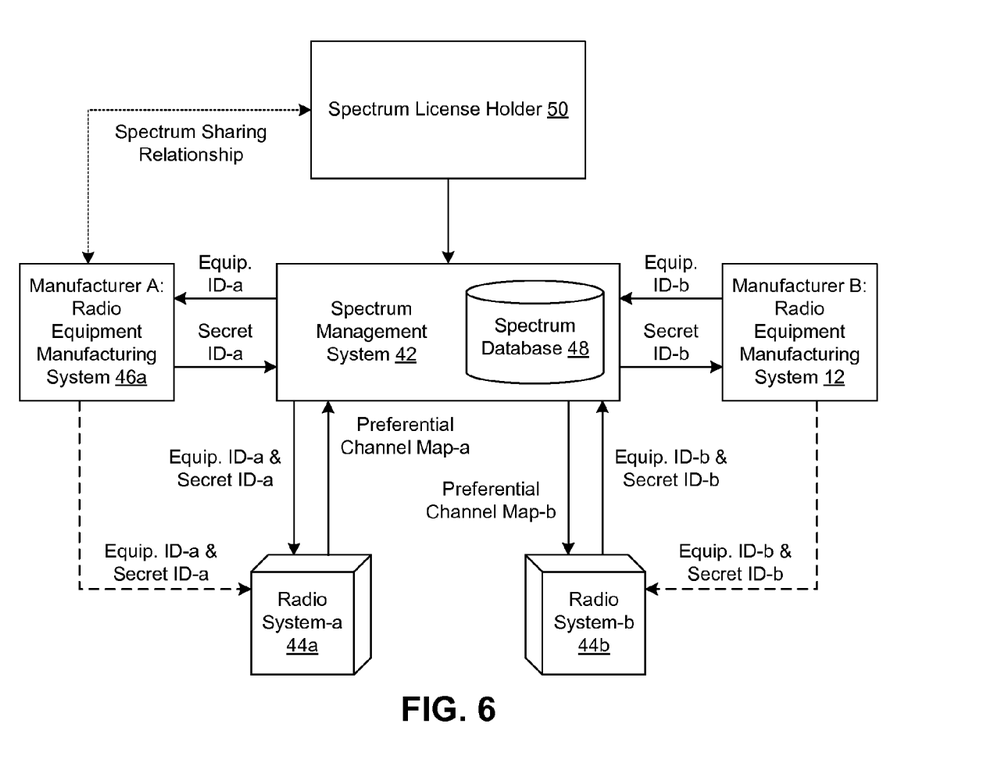

With additional reference to FIG. 6, a spectrum license holder 50 avails licensed spectrum to the spectrum management system 42 for inclusion in the channel maps that are provided to one or more radio systems 44. In one embodiment, the licensed spectrum corresponds to LPTV stations, but it will be recognized that the licensed spectrum may fall outside conventional television bands.

The licensed spectrum may be made available to radio systems 44 on a preferential basis according to secret ID value of the radio system 44, subscription status of the radio system 44, and/or the manufacturer of the radio system 44. In one embodiment, a relationship between a manufacturer and the spectrum license holder 50 exists so that the licensed spectrum is made available only to radio systems 44 made by the manufacturer. In this case, the spectrum license holder and manufacturer may be the same entity or may be separate entities. In another embodiment, the operator of the spectrum management system may acquire use rights in licensed spectrum from the spectrum holder (or may become the holder) in order to attract subscriptions from users of radio systems 44.

In one embodiment, the spectrum management system 42 may construct a channel map for a radio system 44 in stages. For instance, a first search for available spectrum in the location of the radio system 44 may be made to identify available unlicensed spectrum (e.g., TV White Spaces). Licensed spectrum, including licensed spectrum that may be made available to the radio system 44, would not be identified in this search since such licensed spectrum would be identified in the database 48 as allocated. A second search may be made to identify licensed spectrum in the location of the radio system 44 that may be made available for use by the radio system 44 based on the credentials of the radio system 44. The results of the first and second searches may be combined to construct a preferential channel map for the radio system 44. As indicated, any licensed channels in the channel map may be flagged so that the radio system 44 may take advantage of licensed spectrum over unlicensed spectrum.

Under this approach to spectrum allocation, a radio equipment manufacturer may differentiate itself from other manufacturers by effectively being able to offer users radio devices that are entitled to use more spectrum and, by implication, more bandwidth. Also, since access to the licensed spectrum is controllable, QOS options for the manufacturer's radio devices may be increased.

A manufacturer, a group of manufacturers, a community of users, or other entity may be interested in the disclosed spectrum allocation approach in order to make an available spectrum pool larger than possible if just unlicensed spectrum were available. For instance, in urban areas, there are fewer white space gaps than in rural areas. Therefore, using spectrum from dormant LPTV stations or other licensed spectrum in urban areas may facilitate spectrum access to a greater number of radio systems.

If the user of the radio system 44 is obligated to pay for the use licensed spectrum that is included in a preferential channel map, then the radio system 44 (or an associated network management system 12) may determine whether to use licensed spectrum or unlicensed spectrum. This determination may be made using the techniques described in connection with FIGS. 1-3, for example.

In other scenarios, the FCC or other regulatory agency may make spectrum available without license, but for limited purposes such as medical applications or public safety applications. Radio systems that are to be used for this purposes may be encoded with a combination of a secret ID and an equipment ID that may be used to distinguish these radio systems from other radio systems, and appropriately allocate spectrum through corresponding channel maps.

D. Conclusion

Although certain embodiments have been shown and described, it is understood that equivalents and modifications falling within the scope of the appended claims will occur to others who are skilled in the art upon the reading and understanding of this specification.

What is claimed is:

1. A method of availing spectrum to a radio system for conducting wireless communications, the radio system having an equipment identifier (ID) and a secondary ID, comprising:
  receiving a channel map request, the equipment ID and the secondary ID from the radio system; and
  constructing a channel map containing available unlicensed channels and at least one licensed channel that the radio system, as identified by the equipment ID and the secondary ID, has an authorization to use;
  wherein the secondary ID is encoded in the radio system at a time of manufacture of the radio system.

2. The method of claim 1, wherein the secondary ID is provided to a manufacturing system of the radio system by a spectrum management system that constructs the channel map.

3. The method of claim 1, wherein a manufacturer arranges with a license holder of the licensed spectrum channel to make the licensed spectrum channel available in the channel map for the radio system.

4. A method of availing spectrum to a radio system for conducting wireless communications, the radio system having an equipment identifier (ID) and a secondary ID, comprising:
  receiving a channel map request, the equipment ID and the secondary ID from the radio system; and
  constructing a channel map containing available unlicensed channels and at least one licensed channel that the radio system, as identified by the equipment ID and the secondary ID, has an authorization to use;
  wherein the secondary ID is one of a personal ID or a password that is part of or subscribed to the radio system or a user entity of the radio system.

5. A method of availing spectrum to a radio system for conducting wireless communications, the radio system having an equipment identifier (ID) and a secondary ID, comprising:
  receiving a channel map request, the equipment ID and the secondary ID from the radio system; and
  constructing a channel map containing available unlicensed channels and at least one licensed channel that the radio system, as identified by the equipment ID and the secondary ID, has an authorization to use;
  wherein the radio system is a first radio system and the channel map is a first channel map; and
  wherein a second channel map is constructed for a second radio system, the second channel map including a different licensed channel than the licensed channel included in the first channel map.

6. The method of claim 5, wherein the different license channels are attributable to different manufacturers of the radio systems.

7. A method of availing spectrum to a radio system for conducting wireless communications, the radio system having an equipment identifier (ID) and a secondary ID, comprising:
receiving a channel map request, the equipment ID and the secondary ID from the radio system;
constructing a channel map containing available unlicensed channels and at least one licensed channel that the radio system, as identified by the equipment ID and the secondary ID, has an authorization to use; and
determining whether to use the licensed channel or an unlicensed channel for the wireless communications.

8. The method of claim 7, wherein the determination to use the licensed channel or the unlicensed channel is carried out by:
establishing spectrum class determination criteria for the wireless communication application, each determination criterion biased toward one of licensed spectrum or unlicensed spectrum; and
determining to use licensed spectrum or unlicensed spectrum for the wireless communications application by collectively evaluating the determination criteria.

9. A spectrum management system that avails spectrum to a radio system for conducting wireless communications, the radio system having an equipment identifier (ID) and a secondary ID, comprising:
a network interface over which a channel map request, the equipment ID and the secondary ID is received from the radio system; and
a processor configured to construct a channel map containing available unlicensed channels and at least one licensed channel that the radio system, as identified by the equipment ID and the secondary ID, has an authorization to use;
wherein the secondary ID is encoded in the radio system at a time of manufacture of the radio system.

10. The spectrum management system of claim 9, wherein the secondary ID is provided to a manufacturing system of the radio system by the spectrum management system.

11. The spectrum management system of claim 9, wherein a manufacturer arranges with a license holder of the licensed spectrum channel to make the licensed spectrum channel available in the channel map for the radio system.

12. A spectrum management system that avails spectrum to a radio system for conducting wireless communications, the radio system having an equipment identifier (ID) and a secondary ID, comprising:
a network interface over which a channel map request, the equipment ID and the secondary ID is received from the radio system; and
a processor configured to construct a channel map containing available unlicensed channels and at least one licensed channel that the radio system, as identified by the equipment ID and the secondary ID, has an authorization to use;
wherein the secondary ID is one of a personal ID or a password that is part of or subscribed to the radio system or a user entity of the radio system.

13. A spectrum management system that avails spectrum to a radio system for conducting wireless communications, the radio system having an equipment identifier (ID) and a secondary ID, comprising:
a network interface over which a channel map request, the equipment ID and the secondary ID is received from the radio system; and
a processor configured to construct a channel map containing available unlicensed channels and at least one licensed channel that the radio system, as identified by the equipment ID and the secondary ID, has an authorization to use;
wherein the radio system is a first radio system and the channel map is a first channel map; and
wherein the spectrum management system constructs a second channel map for a second radio system, the second channel map including a different licensed channel than the licensed channel included in the first channel map.

14. The spectrum management system of claim 13, wherein the different license channels are attributable to different manufacturers of the radio systems.

15. A spectrum management system that avails spectrum to a radio system for conducting wireless communications, the radio system having an equipment identifier (ID) and a secondary ID, comprising:
a network interface over which a channel map request, the equipment ID and the secondary ID is received from the radio system; and
a processor configured to construct a channel map containing available unlicensed channels and at least one licensed channel that the radio system, as identified by the equipment ID and the secondary ID, has an authorization to use;
wherein the processor is further configured to determine whether the radio system will use the licensed channel or an unlicensed channel for the wireless communications.

16. The spectrum management system of claim 15, wherein the processor is further configured to establish spectrum class determination criteria for the wireless communication application, each determination criterion biased toward one of licensed spectrum or unlicensed spectrum, and determine whether to use licensed spectrum or unlicensed spectrum for the wireless communications application by collective evaluation of the determination criteria.

17. A TV White Spaces band radio (TVBD), comprising:
a transceiver for carrying out wireless data communications;
a memory that stores an equipment identifier (ID) and a secondary ID, the equipment ID and the secondary ID indicative to a spectrum management system that the TVBD is authorized to use predetermined licensed spectrum; and
a controller configured to register for a channel map with the spectrum management system by transmitting a channel map request, the equipment ID and the secondary ID;
wherein the controller is further configured to analyze a channel map that is received from the spectrum management system, the channel map including available unlicensed channels and at least one licensed channel that the radio system, as identified by the equipment ID and the secondary ID, has an authorization to use, so as to determine whether the radio system will use the licensed channel or an unlicensed channel for the wireless communications.

18. The TVBD of claim 17, wherein the controller is further configured to establish spectrum class determination criteria for the wireless data communications, each determination criterion biased toward one of licensed spectrum or unlicensed spectrum, and determine whether to use licensed spectrum or unlicensed spectrum for the wireless communications application by collective evaluation of the determination criteria.

19. A TV White Spaces band radio (TVBD), comprising:
- a transceiver for carrying out wireless data communications;
- a memory that stores an equipment identifier (ID) and a secondary ID, the equipment ID and the secondary ID indicative to a spectrum management system that the TVBD is authorized to use predetermined licensed spectrum; and
- a controller configured to register for a channel map with the spectrum management system by transmitting a channel map request, the equipment ID and the secondary ID;
- wherein the secondary ID is encoded in the radio system at a time of manufacture of the radio system and a manufacturer arranges with a license holder of the licensed spectrum channel to make the licensed spectrum channel available in the channel map for the radio system.

20. A TV White Spaces band radio (TVBD), comprising:
- a transceiver for carrying out wireless data communications;
- a memory that stores an equipment identifier (ID) and a secondary ID, the equipment ID and the secondary ID indicative to a spectrum management system that the TVBD is authorized to use predetermined licensed spectrum; and
- a controller configured to register for a channel map with the spectrum management system by transmitting a channel map request, the equipment ID and the secondary ID;
- wherein the secondary ID is one of a personal ID or a password that is part of or subscribed to the radio system or a user entity of the radio system.

* * * * *